SOUND RECORDING AND REPRODUCING MAGNETOPHONES

Filed June 14, 1968

INVENTOR

Maurice Bardon

BY Alexander & Dowell

ATTORNEYS

United States Patent Office 3,529,833
Patented Sept. 22, 1970

3,529,833

SOUND RECORDING AND REPRODUCING MAGNETOPHONES

Maurice Bardon, Lyon, France, assignor to Teppaz S.A., Lyon, Rhone, France, a French joint-stock company
Filed June 14, 1968, Ser. No. 737,012
Claims priority, application France, June 21, 1967, 48,821
Int. Cl. G11b *5/00*
U.S. Cl. 274—4 6 Claims

ABSTRACT OF THE DISCLOSURE

The sound recording and reproducing apparatus operates with a removable cassette of the kind including a pair of juxtaposed rotatable spools supporting a magnetic tape and guiding rollers for that portion of said tape disposed between the spools, which spools have drilled hubs. The apparatus comprises a stationary support; a carriage to receive the cassette, same being movable on the stationary support between a first and a second position. Two parallel toothed spindles are rotatably supported by the carriage to receive the drilled hubs of the spools of the removable cassette when same is mounted on the carriage. A capstan is also rotatably carried by the carriage to frictionally drive the portion of the tape of said removable cassette which is disposed between the spools thereof when the cassette is mounted on the carriage. A magnetic sound recording and reproducing head is carried by the stationary support to cooperate with the said portion of the tape when carriage is at its second position on said support with the removable cassette mounted on the carriage. A resiliently mounted pressure roller is mounted on the stationary support to press the said portion of the tape against the capstan when the carriage is at its second position on the support with the removable cassette mounted on the carriage. Manually actuated means are provided on the stationary support to displace the carriage on the support between the first and second positions, and vice versa. A driving motor is carried by the stationary support to drive the capstan. A resilient belt connects the motor with the capstan, the motor being so disposed on the stationary support that the belt is effective at least when the carriage is at its second position on the support.

DESCRIPTION OF INVENTION

The present invention relates to improvements in magnetic tape sound recording and reproducing apparatus, of the kind using a magnetic tape wound on two spools held inside a flat case or "cassette," adapted to ensure the simultaneous positioning of said spools on the apparatus, and the accurate guiding of said tape inside the latter.

It is known that, as a result of improvements in magnetic tapes and reading heads, such cases or cassettes are now produced as very compact units, which allows handling them easily and quickly. To obtain good results, however, it is absolutely necessary for the mechanism associated with such cassettes to provide a reliable operation, together with a very simplified control.

In particular, the members ensuring the driving and reading of the magnetic tape should enable a cassette to be positioned and removed easily, while ensuring a positive drive of the tape, and a good cooperation of the latter with the reading head, as well as with the erasing head with which such an apparatus is generally provided. Such requirements are difficult to meet, owing to the standardized configuration of the cassettes, which are generally provided with upper and lower walls.

The object of the present invention is to provide a mechanism answering fully the above conditions.

According to the invention, a sound recording and reproducing apparatus of the kind including a support, a driving motor, two toothed spindles adapted to cooperate with the drilled hubs of the spools of a removable cassette, a capstan mechanism frictionally driving the magnetic tape of the cassette, a resiliently mounted pressure roller adapted to apply said tape against said capstan, and a set of reading and/or erasing heads, is characterized by the fact that said capstan mechanism and toothed spindles are supported by a carriage adapted to move over said plate, so as to be able to be moved away from, or brought nearer to, said set of heads and said pressure roller carried by said support.

The invention will now be described in further detail, with reference to the annexed drawing illustrating, by way of example, an embodiment thereof. In said drawing.

Figures 1, 2, 3:
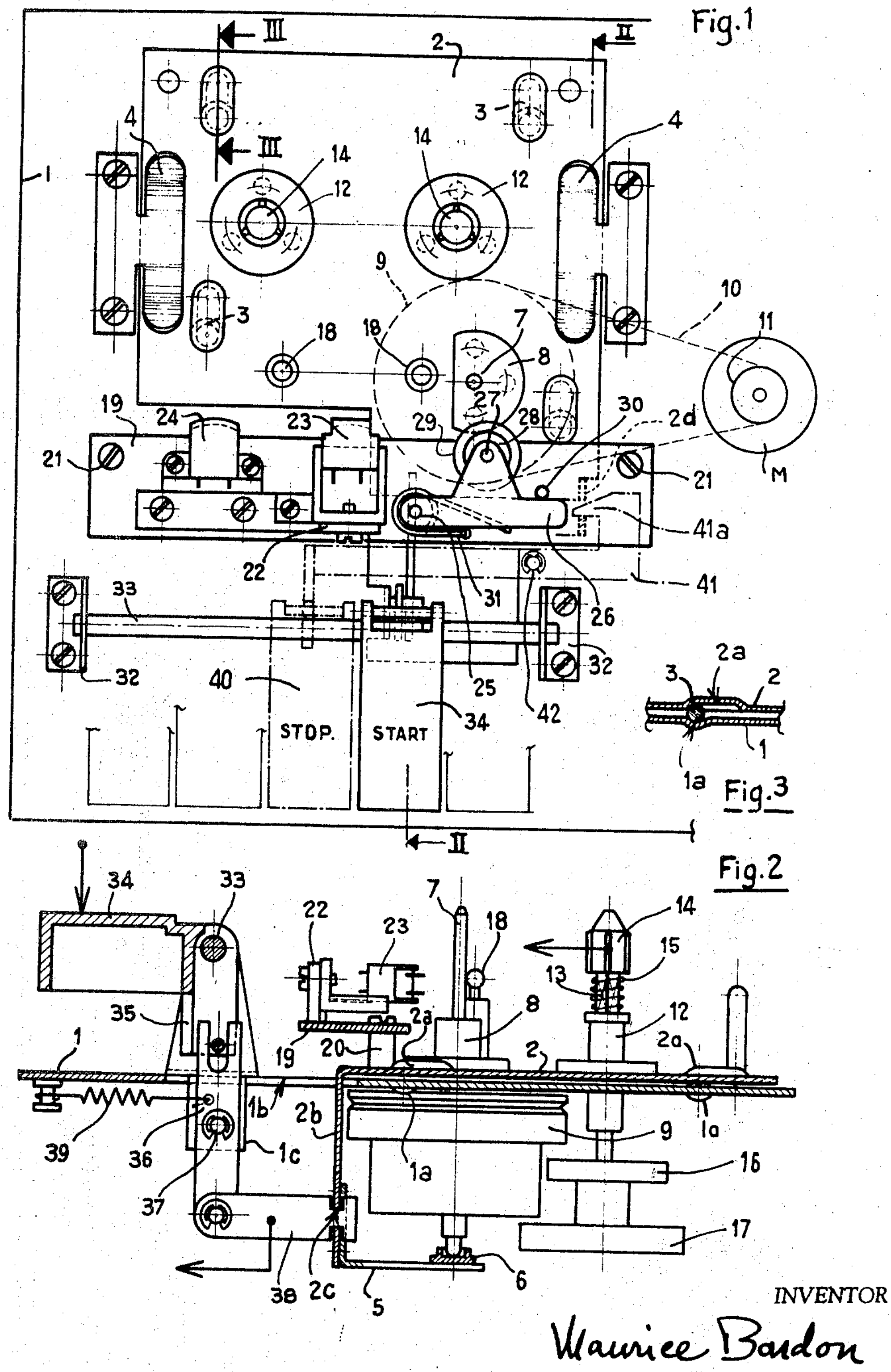
FIG. 1 is a plan view of an apparatus according to the invention, said view being simplified, so as to show only the parts essential for understanding the following description.
FIG. 2 is a section along line II—II of FIG. 1.
FIG. 3 is a detail section along line III—III of FIG. 1, showing one of the members guiding the above-mentioned carriage over the supporting plate of the apparatus.

Referring now to the figures, the apparatus includes a stationary supporting plate 1, mounted at a certain height above a suitable case (not shown). A carriage 2 is adapted to slide over said plate 1, and is guided thereon by ball arrangements, each of which, as shown in FIG. 3, includes a spherical hollow 1*a* in the plate 1, adapted to receive a ball 3, and an elongated hollow 2*a*, provided oppositely in the carriage 2, so as to enable the latter to slide in a predetermined direction, such as downwards when looking at FIG. 1. Said carriage 2 is held against the plate 1, or, more correctly, against the balls 3, by means of two spring strips 4 secured to the plate 1, as shown in FIG. 1.

The carriage 2 is bent at right angles, as shown at 2*b*, so as to pass through a window 1*b* in the plate 1, and to receive a horizontal bracket 5, on which the step-bearing 6 of a capstan 7 is mounted. Said capstan, which is intended to drive a magnetic tape, rotates inside a bearing 8 secured to the plate or carriage 2, and rises up vertically above the latter, with a view to passing through a cassette fitted to the apparatus, while the plate 1 is suitably cut out to enable said bearing to pass therethrough. A driving pulley 9 is keyed on the capstan portion between the plate 1 and the step-bearing 6. As shown in FIG. 1, a belt 10 connects said pulley 9 with the corresponding pulley 11 of a motor *M* carried by the underface of the plate 1.

The cariage 2 supports also the bearings 12 for two spindles 13 adapted to receive the hubs of the tape-carrying spools of a cassette (not shown). The projecting portions of said spindles are of square section, and on each of them a head 14 is slidingly mounted, which head is provided with lateral grooves adapted to engage the teeth of one said hub. A spring 15 holds said head in position, while allowing same to sink, however, when a cassette is positioned on the apparatus, in the event of the respective teeth and grooves not being accurately positioned opposite each other.

The bearings 12 pass through the plate 1, in order to support friction wheels, such as 16 and 17, which cooperate with the slow winding and fast winding mechanism (not shown). Lastly, pins 18, adapted to center a cassette, are secured to the carriage 2.

A crosspiece 19 is mounted on the plate 1, and is secured in position by struts 20 and screws 21. Said crosspiece carries the adjustable support 22 for the reading head 23, the erasing head 24, and a stud 25 to which a strap 26 is linked, said strap carrying the pin 27 for a pressure roller 28, provided with a peripheral lining 29 adapted to cooperate with the capstan 7. Said strap 26 is normally held against a stop 30 by a spring 31, wound round the stud 25, one end of said spring bearing against said strap, while its other end is inserted in a hole in the crosspiece 19.

Two supports 32 are mounted on the plate 1. A spindle 33, adapted to receive the control keys of the apparatus, is disposed between said supports. The starting key 34 is integral with a shank 35, adapted to actuate a rocking lever 36. The latter is linked at 37 to a bracket 1*c* cut out from the plate 1, and its lower end is attached to a link 38, the other end of which is provided with two opposed notches, and is anchored, with a slight play, in a notch 2*c* in the vertical wing 2*b* of the carriage 2. A spring 39 tends to rotate said lever 36 counterclockwise, that is, to push back the carriage 2 upwards, when looking at FIG. 1 of the drawing.

The spindle 33 carries a stop key 40, which is disposed beside the key 34 and, when operated, rotates a lever 41 counterclockwise. Said lever 41 is mounted on a pin 42 carried by the underface of the plate 1, and ends in a triangular nose 41*a*, adapted to cooperate with a vertical lug 2*d* on the carriage 2.

The operation of the device is as follows:

The carriage 2, when at rest, is in its farthest position with respect to the spindle 33, that is, its highest position in FIG. 1 of the drawing. In said position, the location intended to receive a cassette on the carriage is wholly cleared. The user is thus able to position the cassette by lowering same onto said carriage. The heads 14 fit into the bores of the hubs of the tape spools, while the capstan 7 passes through the holes provided in the cassette walls for this purpose. Thereafter, it is only necessary to depress the key 34 to start the apparatus. Said key 34 drives the lever 36, which pulls the link 38 towards the left of FIG. 2, while moving the carriage 2 downwards, when looking at FIG. 1, so that the cassette is brought closer to the heads 23 and 24, as well as to the roller 28. Said heads become applied against the magnetic tape, while the roller 28 cooperates with the capstan 7 to grip said tape, the spring 31 providing the elastic pressure required for the drive. At the end of the travel of the carriage 2, the lug 2*d* encounters the nose 41*a*, and moves it aside in a manner such as to become locked behind same. The carriage 2 is thus held fast, and the apparatus is able to work.

For stopping the apparatus, the key 40 is actuated, and rotates the lever 41 clockwise, when looking at FIG. 1, while releasing the lug 2*d*, and enabling the spring 39 to bring back the assembly to its starting position. The cassette is then released.

It will be noted that, during the displacements of the carriage, the capstan 7 follows a vertical straight line, when looking at FIG. 1, and that the line passing through the centers of the capstan 7 and of the pulley 11 is substantially normal to said straight line, whereby the displacements of the carriage involve only an insignificant variation in the length of the belt 10, which variation is absorbed by the resiliency of said belt.

Obviously, the apparatus just described includes many other mechanical and electric arrangements, which are not described herein because they do not come within the scope of the invention. A safety locking device may be provided, first of all, to prevent the apparatus from starting when it does not contain any cassette. A control switch may also be provided, under the control of the key 34, to start the electric motor only when said key is depressed, and stop it automatically when the key 40 is actuated. A recording key should also be provided, for starting the erasing head 24 and the amplifying circuits, which must then control the head 23 acting as a recording head. In order to enable the tape to be wound and unwound quickly, intermediate friction wheels are provided between the pulley 9 of the capstan 7 and wheels such as 16, 17, mounted on the spindles 13. Such intermediate wheels should be controlled by special keys, and the connection between said keys, integral with the stationary plate 1, and the wheel supports, integral with the movable carriage, should be arranged in a manner such that the movements of the latter are not hampered, which may be achieved in particular by means of pressure transmission gears, or transmission gears acting in a direction normal to the travel of said carriage.

What I claim is:

1. A magnetic tape sound recording and reproducing apparatus for operating with a removable casette of the kind including a pair of juxtaposed rotatable spools supporting a magnetic tape and guiding rollers for that portion of said tape disposed between said spools, said spools having drilled hubs, said apparatus comprising:

- a stationary support;
- a carriage to receive said cassette, said carriage being movable on said stationary support between a first and a second position;
- two parallel toothed spindles rotatably supported by said carriage to receive the drilled hubs of the spools of said removable cassette when same is mounted on said carriage;
- a capstan rotatably carried by said carriage to frictionally drive the portion of the tape of said removable cassette which is disposed between the spools thereof when said cassette is mouted on said carriage;
- a magnetic sound recording and reproducing head carried by said stationary support to cooperate with said portion of said tape when said carriage is at its second position on said support with said removable cassette mounted on said carriage;
- a resiliently mounted pressure roller on said stationary support to press said portion of said tape against said capstan when said carriage is at its second position on said support with said removable cassette mounted on said carriage;
- manually actuated means on said stationary support to displace said carriage on said support between said first and second positions and vice versa;
- a driving motor carried by said stationary support to drive said capstan;
- and resilient belt means to connect said motor with said capstan, said motor being so disposed on said stationary support that said belt means are effective at least when said carriage is at its second position on said support.

2. Apparatus as claimed in claim 1, wherein said carriage is guided over said plate by means of balls held in spherical hollows in the latter, said balls being adapted to slide in elongated hollows in said carriage, while said carriage and said plate are held against each other by spring means.

3. Apparatus as claimed in claim 2, wherein said spring means comprise spring strips secured to said plate and bearing against said carriage, while enabling the latter to slide.

4. Apparatus as claimed in claim 1, wherein said driving motor is carried by said plate, and is connected with said capstan by means of a belt, said capstan being carried by said carriage, the line passing through the centers of the pulleys associated with said belt being in a direction substantially normal to the direction of displacement of said carriage.

5. Apparatus as claimed in claim 1, wherein said carriage is normally returned elastically to its farthest position with respect to said pressure roller, so as to enable a cassette to be positioned or removed, and is brought to its position closest to said roller, that is, its operating position, by means of a control member, while an elastic locking mechanism holds said carriage in its said operating position, said mechanism being adapted to be released upon actuation of a member stopping said magnetophone.

6. In an apparatus as claimed in claim 1, said capstan and said motor each having an axis, said carriage being movable on said stationary support along a straight line approximately normal to a line passing through the axes of said capstan and of said motor at said first and second positions of said carriage.

References Cited

UNITED STATES PATENTS

| | | | |
|---|---|---|---|
| 3,394,898 | 7/1968 | Laa -------------- | 242—55.13 |
| 3,285,526 | 11/1966 | Moore ----------- | 179—100.2 |
| 2,951,914 | 9/1960 | Dubois. | |
| 2,914,620 | 11/1959 | Dale ------------- | 179—100.2 |

HARRY N. HAROIAN, Primary Examiner